Figure 1:
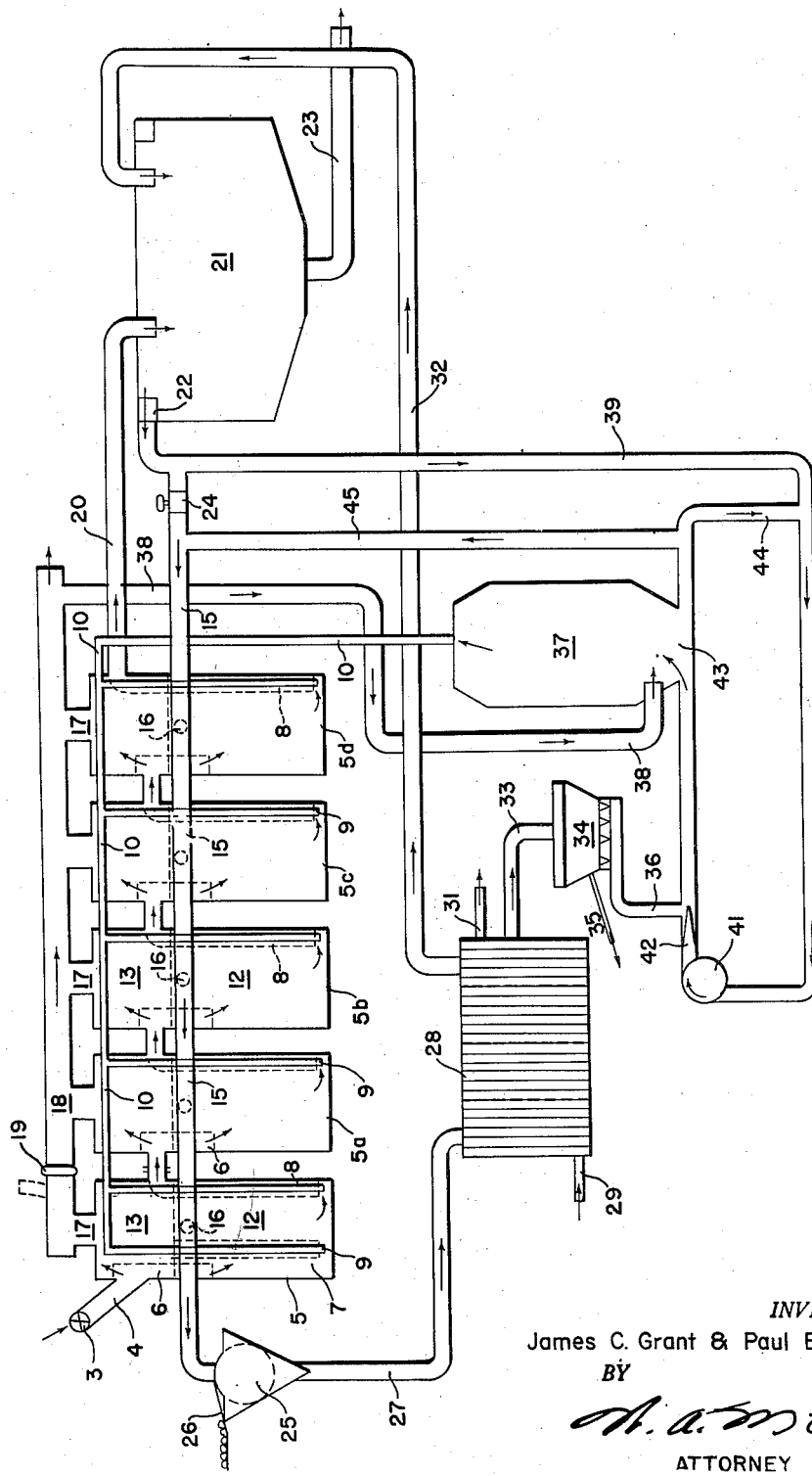

April 15, 1958 J. C. GRANT ET AL 2,830,895
METHOD OF RECOVERING METAL VALUES FROM ORES
Filed Jan. 9, 1953 2 Sheets-Sheet 1

INVENTOR.
James C. Grant & Paul B. Sweet
BY
ATTORNEY

INVENTOR.
James C. Grant & Paul B. Sweet
ATTORNEY

United States Patent Office 2,830,895
Patented Apr. 15, 1958

2,830,895

METHOD OF RECOVERING METAL VALUES FROM ORES

James C. Grant and Paul B. Sweet, Denver, Colo.

Application January 9, 1953, Serial No. 330,572

4 Claims. (Cl. 75—103)

This invention relates to a process for the recovery of the valuable constituents of ores, minerals and metallurgical products and more particularly relates to a leaching treatment of such materials.

At the present time, there are many naturally occurring and similar materials containing two or more and usually several chemical compositions which possess properties preventing recovery of one or more of the valuable constituents by ordinary ore dressing methods. For example, many minerals present in ores as oxide or carbonate constituents can only be effectively separated and recovered by procedures requiring so much plant outlay and processing that they are not economical. Where such constituents occur with other minerals that lend themselves to recovery, the usual practice is to make a charge at the smelter for the presence of such compositions in the concentrates, even though the same metal in other forms would command a substantial price on the market.

As a consequence, in many mining districts, it is the practice to mine around portions of the deposit containing substantial percentages of one or more metals in oxide or carbonate form while removing the high sulfide portions of such ores. As the metal supply of the country approaches extinction, it becomes increasingly important to have some satisfactory method for the treatment of the oxide and carbonate ores. Other materials such as metallurgical products also contain large quantities of metals which could provide substantial tonnages if an economic process were available. As an example, many of the smelter slags contain substantial quantities of one or more metals now in demand but do not lend themselves to economical treatment by available methods.

It is an object of the present invention to provide a simple, efficient and economical process for the treatment of ores, minerals and metallurgical products. Another object of the invention is to provide a simple, efficient and economical process for the recovery of the various valuable constituents of complex ores having oxide or carbonate constituents. A further object of the invention is to provide a leaching treatment for ores, minerals and metallurgical products in which the reagent used as the primary solvents is not dissipated in the treatment.

A still further object of the invention is to provide a simple, efficient and economical leaching treatment including the use of corrosive materials in which the circulatory system is contained in low cost and durable materials which are resistant to the corrosive influences.

Another object of the invention is to provide a novel type of agitation and circulation in leaching treatments to increase the degree of solid to solvent contact and thereby reduce the time required to effect dissolution of materials such as oxide and carbonate minerals.

The novelty of the present invention resides in the arrangement of closed zones of treatment in successive stages all maintained under moderate pressure. In each zone, the ore or other material in finely divided condition is brought into contact with the solvent and at the same time is subjected to rapid and intense agitation preferably in the nature of an air lift action with reagent gases acting as the gaseous media of the air lifts of each stage. When the nature of the material requires it, multiple air lift effects will be provided at a given stage, usually the first stage of the treatment and adequate retention time is provided to promote substantial dissolution. After having initiated a dissolution to a substantial extent in the preliminary stage, the progressive dissolution occurring in successive stages will insure complete or almost complete dissolution by the time the feed material is ready for discharge from the final stage.

Evolved gases of the dissolution treatment are collected and re-used in the treatment and barren solution is recycled to maintain the desired levels in the dissolution stages and to avoid excessive pulp make-up as otherwise would be required.

The precipitation and final recovery stages utilize established and conventional practice except as it has been modified in the way the materials are handled and particularly in the novel circulatory features of the process.

The practice of the invention will be best understood by reference to the accompanying drawings illustrating by flow sheet representation the arrangement of equipment and the circulatory system utilized in typical plant installations.

Figure 2:
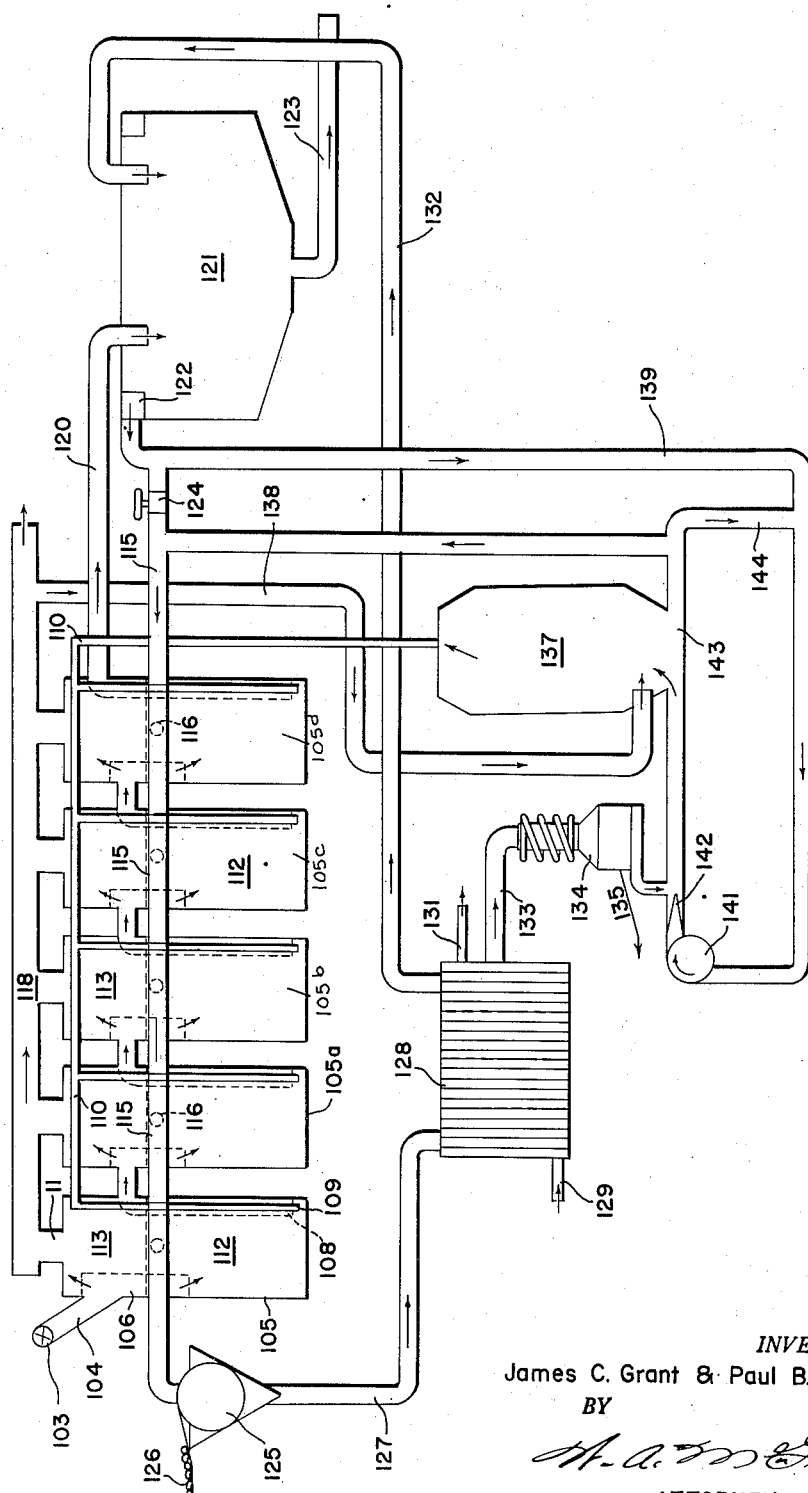

In the drawings:

Fig. 1 represents a circuit utilizing multiple agitation in the first dissolution stage with evolved gas of the first stage collected separately from the evolved gases of the later stages; and Fig. 2 is another typical circuit illustrating an in-series arrangement of the dissolution stages with evolved gases of all stages collected in a single container or passage.

The flow sheet illustrated in Fig. 1 will be described in connection with a typical operation utilizing the novel features of this invention. The ore taken for treatment is an azurite bearing sandstone containing about 10% copper occurring as oxide or carbonate, together with a small amount of iron. Approximately 85% of this ore is in the form of siliceous granules.

The ore is ground or otherwise reduced to −65 mesh or finer and is then mixed with water or other media to form a free flowing pulp. The pulp is fed past a suitable valve 3, such as a star feeder, into the feed inlet 4 of a first leaching tank or stage 5 which is sealed from the atmosphere and operated under moderate pressure.

In this treatment, a relatively long retention time is required in an ammoniacal leaching solution in the first treatment stage in order to get the dissolution initiated to a proper degree. Following the initial dissolution the same type of treatment is performed in successive dissolution stages here shown as 4 but which may be any required number. For convenience in reference, these stages are designated respectively 5a, 5b, 5c and 5d. The incoming ore discharges into a tubular or open-ended feed box 6 and falls by gravity through the contained liquid until acted on by the airlift agitators 7 preferably comprising multiple units but which may comprise only a single unit. The ore after suitable retention and agitation within stage 5, finally passes through the airlift circulator 8 to enter the feed compartment 6 of stage 5a and in similar manner progresses through stages 5b, 5c and 5d.

Except for the degree of agitation and the duration of retention, the action in all of the stages 5a, 5b, 5c and 5d is essentially the same. Gas under suitable pressure is discharged from the air lift nozzles 9 supplied by a suitable header 10 into the lower ends of the agitating air lifts 7 or the circulating air lifts 8 and thereby creates rising columns of liquid in which the ore particles are entrained and subjected to an intense and repeated contact with the gas and circulating solution. Each of the treatment tanks or stages has a liquid fill throughout approximately ⅔ of its depth providing a solution zone 12 in the lower portion of the tank and a gas collection zone 13 in its upper portion. Recirculating solution is delivered through return line 15 having a suitable outlet 16 in each tank. The height of the liquor or solution in the dissolution tanks determines the pressure maintained therein and is subject to control in a manner to be described hereinafter.

Evolved gases collecting within the zone 13 at each stage pass through an outlet 17 and pass into a header 18. In some treatments, it will be desirable or preferable to collect the evolved gases of the first stage separately from the evolved gases of successive stages and as shown in Fig. 1 a suitable partition 19 may be provided to divide the header 18 into two collection zones; the discharge outlet for evolved gases of stage 5 being represented in dotted lines. The spent solids and pregnant solution discharging through the circulating air lift of stage 5d pass into a discharge line 20 which conducts them to a thickener 21 having the usual overflow 22 and underflow discharge 23. The thickener overflow provides the solution return through line 15 to the respective dissolution stages and a valve 24 is provided to regulate the volume of this flow and thereby maintain the desired pressure at the respective stages as aforementioned. Solution not discharging from line 15 at the respective stages constitutes the feed to a filter 25.

The cake discharge 26 of the filter comprises spent solids and is passed to waste while the filtrate comprising pregnant solution passes through a line 27 to a precipitation stage 28.

The precipitator 28 may be any standard unit operating in conventional manner with reagent fed to the unit at 29. Warm air discharging from the precipitator is passed through a line 31 and may be used as a heat source in the plant if desired or wasted while the barren solution returns through a line 32 as a supplemental feed to thickener 21 thereby reducing the solution make-up requirements of the operation. The precipitate or solids discharge of the precipitation stage passes through a line or conduit 33 to a sintering device 34. The sintered product discharges at 35 as the valuable constituent of the treatment (in this case copper) while the evolved gases are delivered through a line 36 as the pressure regulating control of the compressor 37. The compressor section of the operation is a modified Taylor compressor and operates in closed circuit. A portion of the collected gases in header 18 passes into a branch line 38 and comprises part of the feed to the compressor circuit while the excess solution of thickener overflow 22 under control of valve 24 descends through a line 39 and is fed by a pump 41 at high velocity through a venturi nozzle 42 to the feed inlet 43 of compressor 37.

The volume of liquid or solution delivered from thickener overflow 22 to line 39 is always in excess of the quantity required as feed to compressor 37. A portion of this excess returns in closed circuit through a branch 44 into line 39 while the remainder of the excess enters a return line 45 comprising part of the feed to line 15.

In the operation just described, we prefer to use nitric acid only when sulfides are present in ore to initiate the reaction at stage 5 and to this end the acid is introduced in a suitable manner as through a pipe connection to inlet 4 permitting it to flow into and mix with the feed to compartment 6. In the resulting reaction there is an evolution of NO which in the presence of excess oxygen forms $NO_2$ gas which preferably is collected separately as indicated by the partitioning arrangement at 19 and thus provides the nitric acid source for the first reaction stage. In the recovery stage of the treatment, ammonia is used as the reagent of the precipitation treatment, being introduced to precipitator 28 through inlet 29 as ammonium carbonate (which decomposes to provide $NH_3$ gas), and being returned to the process from compressor 37 in the form of $NH_3$ gas delivered through the header 10 as the gaseous supply to air lifts 7 and 8. In one operation on a commercial scale, a plant has operated with only a 0.4% reagent loss due to this circuiting arrangement while recovering substantially the entire copper content of the ore.

The copper recovered as aforesaid is in the form of copper oxide and is easily reduced to powdered form by subjecting it to the action of a suitable reducing agent such as CO gas. Since this procedure is incidental to the actual recovery operations, it has not been depicted in the flow sheet of Fig. 1.

In another typical operation the ore taken for treatment was a complex sulfide of galena, sphalerite and antimony with traces of sulfide silver, bismuth and cadmium. The circuit for this operation has been depicted in Fig. 2. Again in this form we prefer to use nitric acid as the reagent material and due to the presence of the sulfur in the composition, the materials react to form sulfates instead of nitrates. Certain of these sulfates will be in the class of insolubles and following completion of the dissolution treatments will pass from the operation with the thickener sludge. In general, the operation is similar to that previously described with ore discharged by valve 103 descending through the feed inlet 104 to the feed box 106 and thence into the body of solution 112. This ore is subjected to an intense agitation in the first stage 105 by the air lift discharge through nozzle 109 and ultimately passes through air lift 108 to reach the second stage 105a. The same action is repeated in the following stages with the final discharge from stage 105d passing through the line 120 to constitute the feed to thickener 121.

Since the thickener underflow will contain one or more valuable constituents such as the aforementioned lead sulfate, it is subjected to further processing by well known methods to attain the desired separation between the valuable and waste constituents. For example, the lead salts lend themselves to gravity separation methods while other constituents may be effectively recovered by flotation separations.

The thickener overflow discharging at 122 is directed by valve 124 to deliver one portion through line 115 and outlets 116 into the respective stages 105, 105a, 105b, 105c, and 105d with the remainder of such flow passing to the filter 125 with the filter cake discharging as a waste product 126 while the filtrate is conducted through a line 27 into the precipitation stage 128. Where a complex ore is being mixed the precipitation stage will actually be a multiple stage arrangement as indicated by the dotted line representation with separate product recoveries at this stage if desired. The solution containing dissolved zinc values may be subjected to distillation as indicated at 134 with solids recovered at 135 and the barren solution being directed into the closed circuit supplying the compressor 137 under the impelling influence of the pump 141.

We have discovered that zinc may be precipitated as oxide in such a circuit by the simple expedient of reducing the ammonium content to less than 10% and this is the function of the distillation step depicted at 134. The evolved $NH_3$ is conducted into compressor 137 and returns through header 110 to supply the air lifts at the dissolution stages. In order to keep the required ammonium balance in the system we introduce ammonium carbonate at 129, which decomposed to water, carbon dioxide and ammonia. We have found that very satisfactory results can be obtained if the ammonia concentration to the precipitation stage is in the range of 18 to 20% with the reduction to 10% occurring as aforesaid and the concentration being built up again by the circulation through line 138 and compressor 137 and the header 110.

From the foregoing, it will be apparent that the present process may be utilized in the treatment of a wide variety of materials. The chemical reactions utilized in the system are or may be well known and proven procedures and the precipitation stage also may utilize well known chemical reactions. However, it is desirable in utilizing chemical knowledge to employ a reagent which will evolve gases that may be utilized in the reagent make-up of the later stages of the operation. This is particularly true of the use of sulfur dioxide as a lexivent or leaching gas.

From the foregoing description of operating procedure, it will be apparent that the complete circuiting arrangement lends itself to a compact plant design permitting substantial tonnages to be handled in a small amount of apparatus. While we do not wish to be limited to the use of specific materials, we have found that excellent results can be obtained by using large diameter sewer pipe in forming the tanks 5, 5a etc., while smaller diameter sewer pipe may be used for the headers 18, 118, conduits 15, 115, 38, 138 etc. and air lift members 8, 108, while the smallest diameter sizes can be used for lines 10, 110 and nozzles 9, 109. Certain plastic tubing possessing acid resistant properties is also suitable for this purpose.

As a consequence, the initial plant installation is extremely low cost and the durability of the plant material insures lengthy operation without repairs or replacements of the type usually required in leaching plants. Since there are only a few control points in the entire circuit the plant will run efficiently with only a minimum of operating personnel.

We claim:

1. In the process of treating ores for the recovery of their valuable constituents which comprises feeding a pulp of such an ore through a multiple stage leaching zone sealed from the atmosphere throughout the succession of stages and maintained under pressure above atmospheric pressure so as to extract metallic constituents from such ores, suspending the ore at each stage in a body of circulating leaching solution, suspending the ore in the solution while subjecting the resulting pulp to intense agitation induced by an air lift action in which a portion of the gaseous media introduced into the stages dissolves in the liquid to form the reactive composition of the leaching solution, circulating the pulp through the succession of stages by said air lift effects, collecting the gases evolved from the successive stages for re-use in the treatment, moving spent solids and pregnant solution from the sealed zone to a liquid-solids separation stage exteriorly of said zone, returning a controlled volume of the separated liquid through said stages to maintain the desired pressure in the sealed zone, subjecting the remainder of the pregnant solution to a precipitation treatment for the recovery of the valuable constituents with an evolution of gaseous media, compressing evolved gases of precipitation with said collected gases for return to the respective stages as the gaseous media of said air lifting actions.

2. In the process of treating ores for the recovery of their valuable constituents which comprises feeding a pulp of such an ore through a multiple stage leaching zone sealed from the atmosphere throughout the succession of stages and maintained under pressure above atmospheric pressure so as to extract metallic constituents from such ores, suspending the ore at each stage in a body of circulating leaching solution, suspending the ore in the solution while subjecting the resulting pulp to intense agitation induced by an air lift action in which a portion of the gaseous media introduced into the stage dissolves in the liquid to form the reactive composition of the leaching solution, circulating the pulp through the succession of stages by said air lift effects, collecting the gases evolved from the successive stages for re-use in the treatment, moving spent solids and pregnant solution from the sealed zone to a liquid-solids separation stage exteriorly of said zone, returning a controlled volume of the separated liquid through said stages to maintain the desired pressure in the sealed zone, subjecting the remainder of the pregnant solution to a precipitation treatment for the recovery of the valuable constituents with an evolution of gaseous media, circulating evolved gases of precipitation and some pregnant solution in closed circuit including high velocity mixing of the gases and solution, compressing evolved gases of precipitation with said collected gases for return to the respective stages as the gaseous media of said air lifting actions.

3. In the process of treating ores for the recovery of their valuable constituents which comprises feeding a pulp of such an ore through a multiple stage leaching zone sealed from the atmosphere throughout the succession of stages and maintained under pressure above atmospheric pressure so as to extract metallic constituents from such ores, suspending the ore at each stage in a body of circulating leaching solution, suspending the ore in the solution while subjecting the resulting pulp to intense agitation induced by an air lift action in which a portion of the gaseous media introduced into the stage dissolves in the liquid to form the reactive composition of the leaching solution, circulating the pulp through the succession of stages by said air lift effects, collecting the gases evolved from the successive stages for re-use in the treatment, moving spent solids and pregnant solution from the sealed zone to a liquid-solids separation stage exteriorly of said zone, returning a controlled volume of the separated liquid through said stages to maintain the desired pressure in the sealed zone, subjecting the remainder of the pregnant solution to a precipitation treatment for the recovery of the valuable constituents with an evolution of gaseous media, sintering the precipitate of such precipitation treatment for recovery of a metallic sinter, compressing evolved gases of precipitation and sintering with said collected gases for return to the respective stages as the gaseous media of said air lifting actions.

4. In the process of treating copper containing ores for the recovery of their valuable constituents which comprises feeding a pulp of such an ore through a multiple stage leaching zone sealed from the atmosphere throughout the succession of stages and maintained under pressure above atmospheric pressure to extract metallic constituents from such ores, suspending the ore at each stage in a body of circulating leaching solution, suspending the ore in the solution while subjecting the resulting pulp to intense agitation induced by an air lift action in which ammonia gas introduced into the air lift of each stage dissolves in the liquid to form the reactive composition of the leaching solution, circulating the pulp through the succession of stages by said air lift effects, collecting the ammonia gas evolved from the successive stages for re-use in the treatment, moving spent solids and pregnant solution from the sealed zone to a liquid-solids separation stage exteriorly of said zone, returning a controlled volume of the separated liquid through said stages to maintain the desired pressure in the sealed zone, subjecting the remainder of the pregnant solution to a precipitation treatment for the recovery of the copper constituents with an evolution of ammonia, compressing evolved ammonia from precipitation with said collected ammonia from the stages for return to the respective stages as the gaseous media of said air lifting actions.

(References on following page)

References Cited in the file of this patent

UNITED STATES PATENTS

| | | |
|---|---|---|
| 702,582 | Neill et al. | June 17, 1902 |
| 912,541 | Carrick | Feb. 16, 1909 |
| 914,730 | Kingsley | Mar. 9, 1909 |
| 966,389 | Durant et al. | Aug. 2, 1910 |
| 1,150,787 | Rankin | Aug. 17, 1915 |
| 1,204,843 | Bretherton et al. | Nov. 14, 1916 |
| 1,217,437 | Gahl | Feb. 27, 1917 |
| 1,310,724 | Westberg | July 22, 1919 |
| 1,434,485 | D'Adrian | Nov. 7, 1922 |
| 1,575,852 | McCormack | Mar. 9, 1926 |
| 1,799,166 | Hooey | Apr. 7, 1931 |
| 1,848,396 | Stevens | Mar. 8, 1932 |
| 1,879,071 | Busch | Sept. 27, 1932 |
| 2,291,206 | Bowes | July 28, 1942 |
| 2,348,360 | Reed | May 9, 1944 |